(12) United States Patent
Foerster et al.

(10) Patent No.: US 11,461,767 B2
(45) Date of Patent: Oct. 4, 2022

(54) REQUESTING PAYMENTS FOR SELECTED ITEMS OR SERVICES USING PAYMENT TOKENS

(71) Applicant: PAYPAL, INC., San Jose, CA (US)

(72) Inventors: Dawid Foerster, Dublin (IE); Claus Christian Lohmar, Dublin (IE); Thorsten Recker, Dublin (IE)

(73) Assignee: PAYPAL, INC., San Jose, CA (US)

( * ) Notice: Subject to any disclaimer, the term of this patent is extended or adjusted under 35 U.S.C. 154(b) by 283 days.

(21) Appl. No.: 16/807,087

(22) Filed: Mar. 2, 2020

(65) Prior Publication Data

US 2020/0273021 A1 Aug. 27, 2020

Related U.S. Application Data

(63) Continuation of application No. 14/483,095, filed on Sep. 10, 2014, now abandoned.

(51) Int. Cl.
*G06Q 20/36* (2012.01)
*G06Q 20/12* (2012.01)
*G06Q 20/20* (2012.01)
*G06Q 20/40* (2012.01)
*G06Q 20/22* (2012.01)

(52) U.S. Cl.
CPC .......... *G06Q 20/367* (2013.01); *G06Q 20/12* (2013.01); *G06Q 20/20* (2013.01); *G06Q 20/2295* (2020.05); *G06Q 20/401* (2013.01)

(58) Field of Classification Search
CPC ............. G06Q 20/367; G06Q 20/2295; G06Q 20/12; G06Q 20/20; G06Q 20/401

USPC ............................................................ 705/65
See application file for complete search history.

(56) References Cited

U.S. PATENT DOCUMENTS

| | | | | |
|---|---|---|---|---|
| 2006/0031359 A1* | 2/2006 | Clegg | ................ | H04L 51/212 709/206 |
| 2008/0021885 A1* | 1/2008 | Jones | ................ | G06Q 20/145 |
| 2009/0043855 A1* | 2/2009 | Bookstaff | ............ | H04L 51/23 709/206 |
| 2010/0114733 A1* | 5/2010 | Collas | ............. | G06Q 30/0601 705/26.1 |

(Continued)

OTHER PUBLICATIONS

"Transparent Redirect for PayPal Payments Pro (Payflow Edition) and PayPal Payflow Pro, Dec. 2011", published Oct. 25, 2012, 11 pages) (Year: 2012).*

*Primary Examiner* — James D Nigh
(74) *Attorney, Agent, or Firm* — Haynes and Boone, LLP

(57) ABSTRACT

There are provided systems and methods for requesting payment for selected items or services using payment tokens. A first user, such as a requester for a transaction, may initiate a transaction with a merchant for at least one item or service. Upon checkout for the transaction, the first user may request that a second user complete payment for the transaction, such as a parent, spouse, or relative. A payment provider may generate a token for the transaction and instruct the merchant to hold the transaction for a period of time. The token may be communicated to the second user, a payer, for the transaction. The second user may then decide to authorize or decline payment for the transaction. The token may be kept valid for a period of time and the transaction may be cancelled with the merchant if the token is not paid for within the period.

20 Claims, 5 Drawing Sheets

(56) References Cited

U.S. PATENT DOCUMENTS

| | | | |
|---|---|---|---|
| 2012/0171990 A1* | 7/2012 | Williams | G06Q 20/12 455/406 |
| 2013/0060679 A1* | 3/2013 | Oskolkov | G06Q 20/322 705/39 |
| 2013/0332337 A1* | 12/2013 | Tran | G06Q 40/025 705/38 |
| 2015/0326550 A1* | 11/2015 | Schropfer | H04L 63/08 726/7 |

* cited by examiner

REQUESTING PAYMENTS FOR SELECTED ITEMS OR SERVICES USING PAYMENT TOKENS

CROSS REFERENCE TO RELATED APPLICATION

This application is a continuation of U.S. patent application Ser. No. 14/483,095, filed Sep. 10, 2014, which is incorporated by reference herein in its entirety.

TECHNICAL FIELD

The present application generally relates to requesting payment for selected items or services using payment tokens and more specifically to communicating a payment token having a transaction to a payer for authorization of the transaction between another user and a merchant.

BACKGROUND

A user, such as a consumer, may wish to request payment for a transaction from another user. For example, a spouse may select an item as a present or a college student may request assistance paying for various college expenses, such as books. In order to provide payment for the transaction, another user (e.g., a parent, spouse, relative, etc.) may provide the first user with funds to complete the purchase. However, the funds may not completely cover the costs, or the first user may misuse the funds. Thus, in order to insure proper completion of the transaction, the second user may instead directly engage in the transaction, such as by purchasing the items for the first user. In doing so, however, the second user must know the exact items/services the first user wishes to purchase and must either visit the merchant with the first user or have the items/services delivered after purchasing the items/services. In both scenarios, the second user is required to perform time consuming processes, which may add extra costs to a transaction or result in an incorrect transaction.

Figure 1:
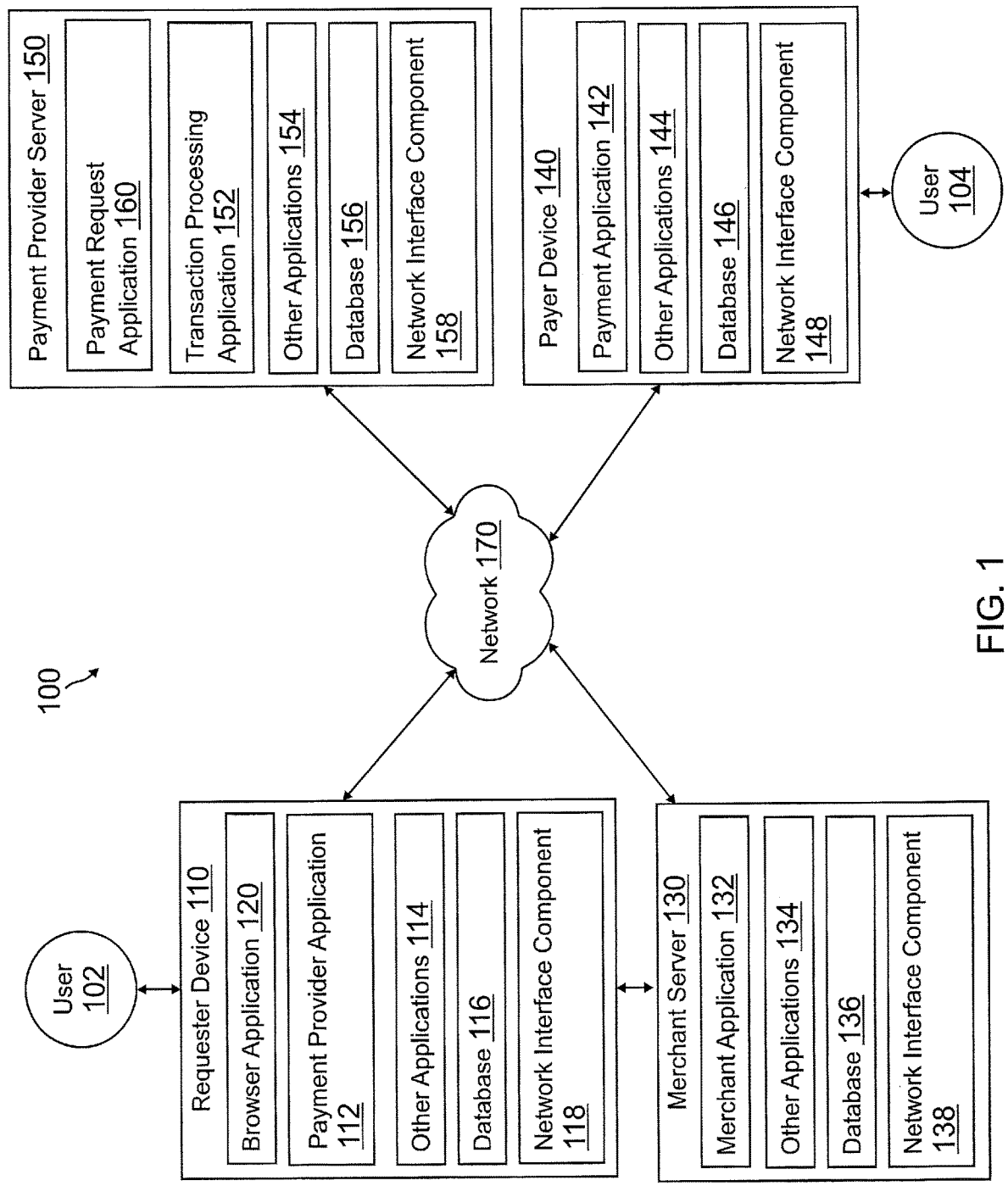
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide for requesting payment for selected items or services using payment tokens, referred to collectively as "item" or "items." Systems suitable for practicing methods of the present disclosure are also provided.

A first user, such as a requester for a transaction, may create a transaction with a merchant by visiting a merchant website or utilizing a merchant application to select one or more items for purchase. Thus, the user may access the merchant online and shop with the merchant. Once the user has selected the item(s) for purchase, the user may checkout through the merchant. The merchant may offer checkout services through a payment provider on the website or in their application, or may redirect the user to the payment provider. The payment provider may offer the user an option to generate a payment token for the transaction, where the payment token includes information about the transaction, such as a payment/transaction request. The payment provider may also request information for a payer for the transaction, such as contact information including a name, account identifier, email address, phone number, messaging address, or other identifier enabling identification of the payer, and similar identifying information for the first user (e.g., the requester). The requester may also add a note or comment about the transaction for the payer to read.

The payment provider may utilize the payer information, the transaction information, and/or the requester information to generate a payment token. The payment token may include information about the transaction, including at least a payment amount for the transaction and the requester contact information for transmitting the payment token. The payment token may also include further information, such as the transaction information (e.g., items/services in the transaction, prices of those items/services, the merchant for the transaction, sales/discounts for the transaction, tax information, and/or shipping information), identifying and/or contact information for the requester of the items/services in the transaction, merchant information, a time limit of the validity of the payment token (i.e., until the transaction is cancelled with the merchant if the payment token is not accepted/declined), the note or comment submitted by the requester for viewing by the payer when receiving the payment token, and/or rules that the requester user has set for payment of the transaction (e.g., where the items/services may be shipped, what the payer may request from the user when paying for the transaction, etc.). Once the payment token is generated, the payment provider may attempt to transmit the payment token to the payer using the identification information for the payer submitted by the requester. If the payer cannot be contacted, the payment provider may alert the requester and/or the merchant in order to correct the issue. The requester may attempt to add new contact/identification information for the payer. In other embodiments, the merchant may cancel the transaction with the requester if the payer cannot be contacted.

Once the payment token is transmitted to the payer, the payer may view the information in the token and decide whether to accept the transaction and process a payment for the transaction or to decline the transaction and not pay for the transaction for the requester. If the payer declines or does not accept payment for the transaction, the transaction may be cancelled with the merchant, or the requester may view the decision to decline by the payer and decide whether the requester would like to pay for the transaction of request payment from another payer. The payer may directly decline the transaction by select a "No," "Decline," or "Deny" option with the payment token. In various embodiments, if the payer does not accept the transaction for the time period that the payment token is valid, the transaction may be declined and the merchant may not receive payment from the payer.

If the payer accepts the transaction in the payment token, the payer may be redirected to the merchant website and/or the payment provider website to process and complete a payment for the transaction. The payer may then provide a payment instrument, such as a payment account with the payment provider, and may complete a payment process for the transaction. When completing the payment process, the payer may set various rules or conditions based on their payment of the transaction, such as a request for account of expenses, a requirement to receive a certain grade or mark based on their scholastic achievements, a request for additional information about the transaction, and/or information about use of the items/services in the transaction. The payer may also add a note about accepting and/or declining payment for the transaction, which may be provided to the requester. Once the transaction is accepted and payment for the transaction is processed, the merchant may be informed and may begin the process of providing the items/services in the transaction to the requester.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first user 102, a second user 104, a requester device 110, a merchant server 130, a payer device 140, and payment provider server 150 in communication over a network 170. First user 102, such as a consumer, may utilize requester device 110 to initiate a transaction with merchant server 130. One checkout, first user 102 may select to have second user 104 pay for the transaction. Thus, payment provider server 150 may be utilized to generate a payment token for transmission to payer device 140. If second user 104 accepts responsibility to pay for the transaction, a payment to merchant server 130 may be completed using payment provider server 150.

Requester device 110, merchant server 130, payer device 140, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Requester device 110 may be implemented using any appropriate hardware and software configured for wired and/or wireless communication with merchant server 130, payer device 140, and/or payment provider server 150. For example, in one embodiment, requester device 110 may be implemented as a personal computer (PC), a smart phone, laptop/tablet computer, wristwatch with appropriate computer hardware resources, eyeglasses with appropriate computer hardware (e.g. GOGGLE GLASS®), other type of wearable computing device, and/or other types of computing devices capable of transmitting and/or receiving data, such as an IPAD® from APPLE®. Although a requester device is shown, the requester device may be managed or controlled by any suitable processing device. Although only one requester device is shown, a plurality of requester devices may function similarly.

Requester device 110 of FIG. 1 contains a browser application 120, a payment provider application 112, other applications 114, a database 116, and a network interface component 118. Browser application 120, payment provider application 112, and other applications 114 may correspond to processes, procedures, and/or applications, for example, a software program, executable by a hardware processor. In other embodiments, requester device 110 may include additional or different software as required.

Browser application 120 may be used, for example, to provide a convenient interface to permit user 102 to browse the Internet, including navigation to websites and between webpages of websites. Browser application 120 may therefore be configured to transmit and receive information, such as webpage requests, input to webpages, downloads and uploads of data, such as data in database 116 of user device 110, etc. In various embodiments, browser application 120 may be used to access a website corresponding to merchant server 130 and select one or more items and/or services for purchase in a transaction. In other embodiments, browser application 120 may correspond to a dedicated application for merchant server 130, such as a merchant specific application (e.g., a marketplace application specific to merchant server 130), where first user 102 may view items/services available from merchant server 130 to purchase. Using browser application 120, first user 102 may generate a transaction. First user 102 may also utilize browser application 120 to initiate a checkout for the transaction. Merchant server 130 may request checkout information from first user 102 directly on the merchant website or in the merchant application through browser application 120, may redirect first user 102 to a website of payment provider server 150, or may utilize payment provider application 112 to request checkout information.

During the checkout processing using one or more of browser application 120 and/or payment provider application 112, first user 102 may select to having second user 104 (e.g., a payer) pay for the transaction. Thus, first user 102 may enter information enabling identification of second user 104, such as a name, account identifier, phone number, email address, messaging contact, or other identification information during checkout. First user 102 may provide similar information for first user 102's identification information enabling second user 104 to identify who is requesting payment for the transaction. First ser 102 may also provide other information during checkout, such as a message or comment for the transaction, rules about payment for the transaction by second user 104, shipping information for the items/services purchased, and/or information about the transaction displayed to second user 104 when requesting payment for the transaction. Once first user 102 has completed entry of checkout information to have second user 104 pay for the transaction, a payment token may be transmitted to payer device 140 by payment provider server 150, as will be explained in more detail herein. In certain embodiments, the identification information for second user 104 may not enable contact of second user 104. Thus, first user 102 may be informed of the incorrect identification/contact information, and new information may be request or a notification cancellation of the transaction may be transmitted to first user 102. If second user 104 accepts or declines payment, first user 102 may view the decision using one or more of browser application 120 and/or payment provider application 112. If second user 104 accepts payment, first user 102 may view a transaction history, payment, rules regarding payment of the transaction, rules regarding use of items/services in the transaction, and/or shipping/pickup information for completion of the transaction. If second user 104 declines payment, first user 102 may view the decision and any comments made by second user 104. Additionally, if second user 104 declines payment, first user 102 may utilize payment provider application 112 to complete payment for the transaction, or may request a new payer to be sent the payment token for a request for payment for the transaction.

Thus, payment provider application 112 may be used, for example, to provide a convenient interface to permit first user 102 to select payment options and provide payment for items and/or services. For example, payment provider application 112 may be implemented as an application having a user interface enabling the user to enter payment options for storage by requester device 110, provide payment to merchant server 130, and complete a transaction for the items and/or services using a payment instrument (e.g., a payment account with payment provider server 150). In certain embodiments, payment provider application 112 may correspond more generally to a web browser configured to view information available over the Internet or access a website corresponding to a payment provider.

In various embodiments, one or more features of browser application 120 and/or payment provider application 112 may be incorporated in the same application so as to provide their respective features in one application.

Requester device 110 includes other applications 114 as may be desired in particular embodiments to provide features to requester device 110. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking, online payments, money transfer, or other applications associated with payment provider server 150. Other applications 114 may include browser, social networking, and/or mapping applications. Various applications, features, and/or processes of other applications 114 may be used in conjunction with browser application 120 and/or payment provider application 112. Other applications 114 may contain software programs, executable by a processor, including a graphical user interface (GUI) configured to provide an interface to the user.

Requester device 110 may further include database 116 which may include, for example, identifiers such as operating system registry entries, cookies associated with browser application 120, payment provider application 112, and/or other applications 114, identifiers associated with hardware of requester device 110, or other appropriate identifiers, such as identifiers used for payment/user/device authentication or identification. Identifiers in database 116 may be used by a payment/credit provider, such as payment provider server 150, to associate requester device 110 with a particular account maintained by the payment/credit provider. The identifiers may also be used by a merchant, such as merchant server 130 to identify first user 102 and/or a merchant account with the merchant. Database 110 may include transaction information and/or payment decisions for transaction after receipt from one or more of merchant server 130 and/or payment provider server 150.

Requester device 110 includes at least one network interface component 118 adapted to communicate with merchant server 130, payer device 140, and/or payment provider server 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant server 130 may be maintained, for example, by an online merchant, which may offer one or more items and/or services for purchase through a merchant website and/or merchant application. In this regard, merchant server 130 includes one or more processing applications which may be configured to interact with requester device 110 and/or payer device 140 to facilitate generation of a transaction and payment for the transaction using a payment token. In one example, merchant server 130 may be provided by EBAY®, Inc. of San Jose, Calif., USA or STUBHUB®, Inc. of San Francisco, Calif. However, in other embodiments, merchant server 130 may be maintained by or include any merchant, including merchants that offer offline sales of items and/or services through merchant locations. Moreover, in various embodiments, one or more of the applications, processes, and/or features discussed below in reference to merchant server 130 may be included in payment provider server 150, and vice versa.

Merchant server 130 of FIG. 1 contains a merchant application 132, other applications 134, a database 136, and a network interface component 138. Merchant application 132 and other applications 134 may correspond to processes, procedures, and/or applications, for example, a software program, executable by a hardware processor. In other embodiments, merchant server 130 may include additional or different software as required.

Merchant application 132 may also be utilized to, for example, provide a merchant sales and/or marketplace interface permitting user 102 to browse items for sale from a merchant corresponding to merchant server 130. In this regard, merchant application 132 includes one or more processes and/or features to transmit the interface over network 180 to user device 110 for display to first user 102, for example, using browser application 120. The interface may enable first user 102 to view one or more items and/or services for sale from the merchant and select one or more of the items/services for purchase. After selecting items for purchase, merchant application 132 may generate a transaction for the selected item(s)/service(s), for example, by gathering the item(s)/service(s) into a shopping basket and providing a checkout interface for completion of the transaction. The checkout interface may include an option for first user 102 to provide payment for the transaction, for example, using payment provider application 112 and payment provider server 150. In various embodiments, the checkout interface may further allow first user 102 to enter information to have another user (e.g., a payer, such as second user 104) to provide payment for the transaction.

If payment by another user is selected by first user 102, merchant application 132 may request information used to generate a payment token by payment provider server 150 or merchant application 132 may redirect first user 102 to payment provider server 150 for collection of the information. In either embodiments, information requested for use in generating a payment token to be transmitted to the payer (e.g., first user 102) may include payer identification information (e.g., identification information for second user 104, such as contact information enabling transmission of the payment token), requester identification information (e.g., identification information for first user 102, such as sufficient information for second user 104 to identify first user 102 as transmitting the payment token), a message, note, or other comment by user 102 for second user 104, selected transaction information to be added to the payment token and/or removed/redacted from the payment token, and/or rules regarding payment for the transaction. Once the selected information is accrued by merchant server 130 and/or payment provider server 150, payment provider server 150 may generate a payment token, transmit the payment token to payer device 140, and receive a decision on the payment token, as will be explained in more detail herein.

During or after generation of the payment token by payment provider server 150, merchant application 132 may suspend the transaction for first user 102. The transaction may be left suspended (e.g., the items/services may be held) for an amount of time determined by the merchant corresponding to merchant server 130 and/or first user 102 when requesting payment for the transaction. If second user 104 is not contacted successfully (e.g., the identification information does not enable payment provider server 150 to transmit the payment token) then merchant application 132 may alert first user 102, cancel the transaction, and/or request new identification/contact information for second user 104. If the payment token is successfully transmitted, merchant application 132 may alert first user 102 of the transmission and the amount of time the payment token is valid. Once a decision on payment for the transaction is made by second user 104, merchant application 132 may alert first user 102 of the decision. Where second user 104 has selected to pay for the transaction, merchant application 132 may provide a transaction history (e.g., receipt) to first user 102 may begin the process of providing first user 102 with the selected item(s)/service(s) in the transaction. However, if second user 104 declines payment or if the payment token expires, merchant application 132 may request payment by first user 102, allow first user 102 to identify another payer, or may cancel the transaction.

In various embodiments, merchant server 130 includes other applications 134 as may be desired in particular embodiments to provide features to merchant server 130. For example, other applications 134 may include security applications for implementing server-side security features, programmatic server applications for interfacing with appropriate application programming interfaces (APIs) over network 170, or other types of applications. Other applications 134 may contain software programs, executable by a processor, including a graphical user interface (GUI), configured to provide an interface to a user.

Additionally, merchant server 130 includes database 136. First user 102 and/or second user 104 may establish one or more merchant accounts having user information with merchant server 130. User accounts in database 136 may include a name, address, birthdate, payment/funding information, additional user financial information, and/or other desired user data. First user 102 and/or second user 104 may link to their respective accounts through a user and/or device identifier. In other embodiments, first user 102 and/or second user 104 may not have previously established an account and may provide other information to merchant server 130 to generate and/or complete financial transactions, as previously discussed. Database 136 may further include information used by merchant application 132 to provide a merchant sales and/or marketplace interface, such as item inventory information and pricing, interface components, and/or seller information.

In various embodiments, merchant server 130 includes at least one network interface component 138 adapted to communicate requester device 110, payer device 140, and/or payment provider server 150 over network 170. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Payer device 140 may be implemented using any appropriate hardware and software configured for wired and/or wireless communication with requester device 110, merchant server 130, and/or payment provider server 150. Payer device 140 may correspond to a device utilized by user 104 to receive a payment token for a transaction and make a decision on whether to pay for the transaction. Thus, payer device 140 may be implemented as a personal computer (PC), a smart phone, laptop computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a payer device is shown, the payer device may be managed or controlled by any suitable processing device. Although only one payer device is shown, a plurality of payer devices may function similarly.

Payer device 140 of FIG. 1 contains a payment application 142, other applications 144, a database 146, and a network interface component 148. Payment application 142 and other applications 144 may correspond to processes, procedures, and/or applications, for example, a software program, executable by a hardware processor. In other embodiments, payer device 140 may include additional or different software as required.

Payment application 142 may be used, for example, to provide a convenient interface to permit second user 104 to select payment options and provide payment for received payment tokens. For example, payment application 142 may be implemented as an application having a user interface enabling the user to enter payment options for storage by payer device 140, provide payment to merchant server 130, and complete payment for a transaction in a payment token. In certain embodiments, payment application 142 may correspond more generally to a web browser configured to view information available over the Internet or access a website corresponding to a payment provider.

Thus, payment application 142 may first receive a payment token generated by payment provider server 150, as will be explained in more detail herein. In this regard, payment application 142 may correspond to an application that may provide an interface where first user 102 may view a received payment token. The interface may display to second user 104 the payment token information, including at least a payment amount and the submitted identification information for second user 104. The payment token may further include transaction details (e.g., items/services selected, cost of each selected item/service, tax costs, discounts or benefits applied to the transaction, merchant name for the transaction, etc.), identification information for first user 102, a message, comment or note by first user 102, a time until expiration of the payment token, and/or merchant information. Thus, payee device 140 may receive the payment token after the payment token is generated by payment provider server 150 using the aforementioned information, as will be discussed in more detail herein. Second user 104 may then decide to accept responsibility to pay for the transaction through the payment token or may decline to pay for the transaction. If second user 104 does not view or accept by expiration of the payment token, the payment token may become invalid and it may be considered that second user 104 has declined to pay for the transaction in the payment token, which may be transmitted to payment provider server 150. Additionally, if second user 104 declines payment, the decision to decline may be similarly transmitted to payment provider server 150.

However, if second user 104 accepts payment for the transaction/payment amount in the payment token, a payment request for the transaction may be communicated to payment provider server 150 by payment application 142. The payment request may instruct payment provider server 150 to provide payment for the transaction. Additionally, the payment request may denote a payment instrument that payment provider server 150 may utilize to provide the payment for the transaction. Payment application 142 may utilize a credit/debit card, a bank account, payment account with payment provider server 150, etc. When either accepting or declining payment, second user 104 may further enter a note, comment, or other free text for transmission to first user 102 and/or add rules regarding payment of the transaction for first user 102.

The payment request may correspond to a token including the selected payment instrument for first user 102 as well as identification of the payment token and/or transaction in the payment token. Once the payment request is generated, second user 104 may authorize the payment request for transmission to payment provider server 150 in order to effectuate a payment to merchant server 130 for the transaction. In other embodiments, payment application 142 may transmit the payment request as a token with a payment instrument, an identifier for second user 104, and/or an identifier for the transaction to merchant server 130 for processing a payment for the transaction. Once a payment is processed for the transaction, payment application 142 may receive a transaction history documenting completion of the payment. Payment application 142 may correspond to a dedicated application for payment provider server 150 (e.g., a specific device application) or may correspond to a browser application.

Payer device 140 includes other applications 144 as may be desired in particular embodiments to provide features to payer device 140. For example, other applications 144 may include security applications for implementing client-side security features, programmatic client applications for interfacing with appropriate application programming interfaces (APIs) over network 170, or other types of applications. In various embodiments, other applications 144 may include financial applications, such as banking, online payments, money transfer, or other applications associated with payment provider server 150. Other applications 144 may include browser, social networking, and/or mapping applications. Various applications, features, and/or processes of other applications 144 may be used in conjunction with payment application 142. Other applications 144 may contain other software programs, executable by a processor, including a graphical user interface (GUI) configured to provide an interface to the user.

Payer device 140 may further include database 146 which may include, for example, identifiers such as operating system registry entries, cookies associated with payment application 142 and/or other applications 144, identifiers associated with hardware of payer device 140, or other appropriate identifiers, such as identifiers used for payment/user/device authentication or identification. In one embodiment, identifiers in database 146 may be used by merchant server 130 and/or payment provider server 150 to associate payer device 140 with a particular account maintained by merchant server 130 and/or payment provider server 150. Database 146 may also store received payment tokens and associated information, such as decisions on payment tokens and/or transaction histories for paid transaction and their associated payment tokens. Database 146 may also store financial information used by payment application 142 to process payments.

Payer device 140 includes at least one network interface component 148 adapted to communicate with requester device 110, merchant server 130, and/or payment provider server 150. In various embodiments, network interface component 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 150 may be maintained, for example, by an online payment service provider, which may provide payment services and/or processing for financial transactions on behalf of users, including generation of tokens for use in requesting and completing payments by two or more users. In this regard, payment provider server 150 includes one or more processing applications which may be configured to interact with requester device 110, merchant server 130, and/or payer device 140 to facilitate payment for a transaction. In one example, payment provider server 150 may be provided by PAYPAL®, Inc. of San Jose, Calif., USA. However, in other embodiments, payment provider server 150 may be maintained by or include a credit provider, financial services provider, financial data provider, and/or other service provider, which may provide payment services to user 102 and/or the merchant. Moreover, in various embodiments, one or more of the applications, processes, and/or features discussed below in reference to payment provider server 150 may be included in merchant server 130, and vice versa.

Payment provider server 150 of FIG. 1 includes a payment request application 160, a transaction processing application 152, other applications 154, a database 156, and a network interface component 158. Payment request application 160, transaction processing application 152 and other applications 154 may correspond to processes, procedures, and/or applications, for example, a software program, executable by a hardware processor. In other embodiments, payment provider server 150 may include additional or different software as required.

Payment request application 160 may correspond to an application configured to receive information used to generate a payment token for a transaction, verify identification and/or contact information for the payer of the transaction (e.g., second user 104), transmit the payment token to the payer, and take additional steps necessary after a decision is made regarding payment corresponding to the payment token. In this regard, payment request application 160 may receive information from first user 102 (e.g., through user device 110) for a transaction and the associated payer for the transaction, or may receive such information from merchant server 130 after collection by merchant server 130. The information necessary to generate a payment token may include at least a payment amount for the transaction and a payer for the transaction (e.g. identification/contact information for second user 104). As previously discussed, the information may further include transaction details (e.g., items/services selected, cost of each selected item/service, tax costs, discounts or benefits applied to the transaction, merchant name for the transaction, etc.), identification information for first user 102, a message, comment or note by first user 102, a time until expiration of the payment token, and/or merchant information. Once the information has been received payment request application 160 may generate a payment token.

After generation of the payment token, payment request application 160 may attempt to transmit the payment token to second user 104, the designated payer for the transaction. If the contact information cannot be determined for second user 104 using the supplied identification information, payment request application 160 may alert first user 102 and/or merchant server 130 of the failure to communicate the payment token to second user 104. Merchant server 130 may then cancel the transaction. However, new information identifying second user 104 may also be supplied to payment request application 160, which may further attempt to communicate the payment token. Once the payment token is communicated to payer device 140 for viewing by second user 104, payment request application 160 may await a response from second user 104.

If second user 104 declines payment for the transaction or does not accept payment within the validity period of the payment token, payment request application 160 may alert user 102 and/or merchant server 130 of the failure to receive payment. Thus, first user 102 and/or merchant server 130 may take further actions, such as cancellation of the transaction, payment by first user 102, and/or payment by another payer. However, if second user 104 accepts payment for the transaction designated in the payment token, payment request application 160 may receive the payment request for the transaction and begin processing the payment request using transaction processing application 152. Payment request application 160 may notify first user 102 and/or merchant server 130 that second user 104 has accepted responsibility to pay for the transaction.

Transaction processing application 152 may be configured to receive information from and/or transmit information to requester device 110, merchant server 130, and/or payer device 140 for processing and completion of transactions generated by user 102 and paid for by user 104. Transaction processing application 152 may include one or more applications to process the transaction from first user 102 and merchant server 130 by receiving a payment request to complete payment for the transaction of items and/or services offered by the merchant corresponding to merchant server 130. The payment request may correspond to a payment from second user 104 to the merchant. The payment may include a user account identifier or other payment information (e.g. a credit/debit card or checking account) for second user 104 and a receiving account for the merchant. Additionally, the payment request may include a payment amount and terms of payment (e.g., notes from second user 104 and/or rules set for second user 104 for payment of the transaction). Transaction processing application 152 may complete the transaction by providing payment to the merchant through the receiving account/payment information. Additionally, transaction processing application 152 may provide transaction histories, including receipts, to requester device 110, merchant server 130, and/or payer device 140 for completion and documentation of the transaction. For example, a transaction history may be provided to requester device 110, merchant server 130, and/or payer device 140 to allow for the respective users and/or merchants to view the transaction and provide the items and/or services to first user 102.

In various embodiments, payment provider server 150 includes other applications 154 as may be desired in particular embodiments to provide features to payment provider server 150. For example, other applications 154 may include security applications for implementing server-side security features, programmatic server applications for interfacing with appropriate application programming interfaces (APIs) over network 170, or other types of applications. Other applications 154 may contain software programs, executable by a processor, including a graphical user interface (GUI), configured to provide an interface to a user.

Additionally, payment provider server 150 includes database 156. As previously discussed, first user 102, second user 104, and/or the merchant corresponding to merchant server 130 may establish one or more payment accounts with payment provider server 150. User accounts in database 156 may include user/merchant information, such as name, address, birthdate, payment/funding information, additional user financial information, and/or other desired user data. First user 102, second user 104, and/or the merchant may link to their respective payment accounts through a user, merchant, and/or device identifier. Thus, when an identifier is transmitted to payment provider server 150, e.g. from requester device 110, merchant server 130, and/or payer device 140, a payment account belonging to first user 102, second user 104, and/or the merchant may be found. In other embodiments, first user 102 and/or the merchant may not have previously established a payment account and may provide other financial information to payment provider server 150 to complete financial transactions, as previously discussed. Database 156 may further include information received for use in generated payment tokens, generated payment tokens and their respective information, and/or decisions regarding payment tokens. Transaction histories used to document payment for transactions corresponding to payment tokens may also be stored by database 156 for distribution to first user 102, second user 104, and/or the merchant.

In various embodiments, payment provider server 150 includes at least one network interface component 158 adapted to communicate requester device 110, merchant server 130, and/or payer device 140 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
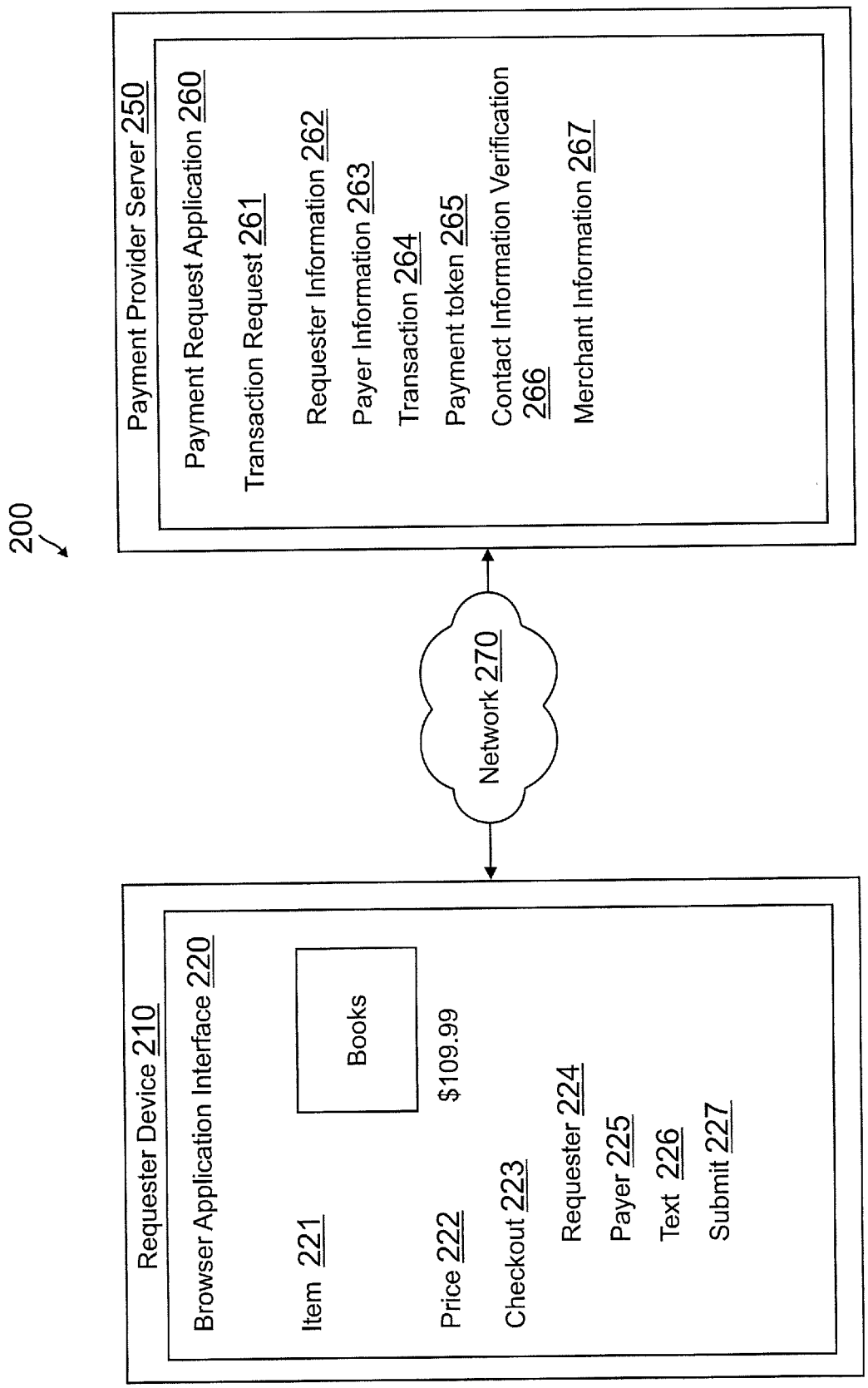
FIG. 2 is an exemplary system environment showing a requesters device creating a transaction with a merchant for use in generating a payment token to a payer, according to an embodiment.

FIG. 2 is an exemplary system environment showing a requesters device creating a transaction with a merchant for use in generating a payment token to a payer, according to an embodiment. Environment 200 of FIG. 2 includes a requester device 210, a payment provider server 250, and a network 270 corresponding generally to requester device 110, payment provider server 150, and network 170, respectively, of FIG. 1.

Requester device 210 displays a browser application interface 220 corresponding generally to the processes and features described in reference to browser application 120 of FIG. 1. As previously discussed, a user device executing a browser application may display a merchant's sales website or marketplace where a user may select items and/or services for purchase in a transaction. In other embodiments, the browser application may instead correspond to a dedicated application for the merchant. Thus, browser application interface 220 displays item 221, such as a selected item for purchase in a transaction, a price 222, and a checkout 223 process. Item 221 may correspond to an item offered for sale from a merchant (not shown) via the merchant's server and/or a physical merchant location where the user may, pick up the product and/or have delivered from. Price 222 corresponds to a price for item 221, such as a transaction price, shown as $109.99. Once the user is satisfied with the transaction, the user may initiate a checkout process through checkout 223. Checkout 223 includes a requester field 224, a payer field 225, a text field 226, and a submit button 227. Requester field 224 may include a field to enter identification information for the requester of payment for a transaction including item 221 and price 222. Payer field 225 may have similar identification information and/or contact information for the payer of the transaction, such as a person/user that requester 224 is requesting payment from for the transaction. The requester (e.g., the user of requester device 210) may enter a message, comment, or note to the transaction for transmission to the payer into text field 226. Additional information may also be selected and/or entered under checkout 223 in various embodiments. Once the requester is satisfied with their entries, the requester may select submit button 227 to transmit the request for payment to payment provider server 250 over network 270.

Payment provider server 250 executes a payment request application 260 corresponding generally to the processes and features described in reference to payment request application 160 of FIG. 1. Payment request application 260 may be configured to generate a payment token for the transaction and request to pay for the transaction generated and submitted to payment provider server 250 during checkout 223. Thus, payment request application 260 includes a transaction request 261 corresponding to the transaction and the request to pay the transaction by a payer. Transaction request 261 includes requester information 262 and payer information 263 corresponding generally to the payment requester and the payment payer, respectively. Requester information 262 and payer information 263 may include contact information enabling payment request application 260 to contact the requester and payer. Transaction request 261 further include transaction 264 having details of the transaction, such as the items/service (e.g., item 221), prices (e.g., 222), and other transaction information. Using this information, payment token 264 may be generated. Once generated, payment request application 260 may verify the contact information for the payer by determining contact information verification 266. Payment request application 260 may further include merchant information 267 used to communicate the result of contact information verification to and any decisions regarding payment token 264.

Figure 3:
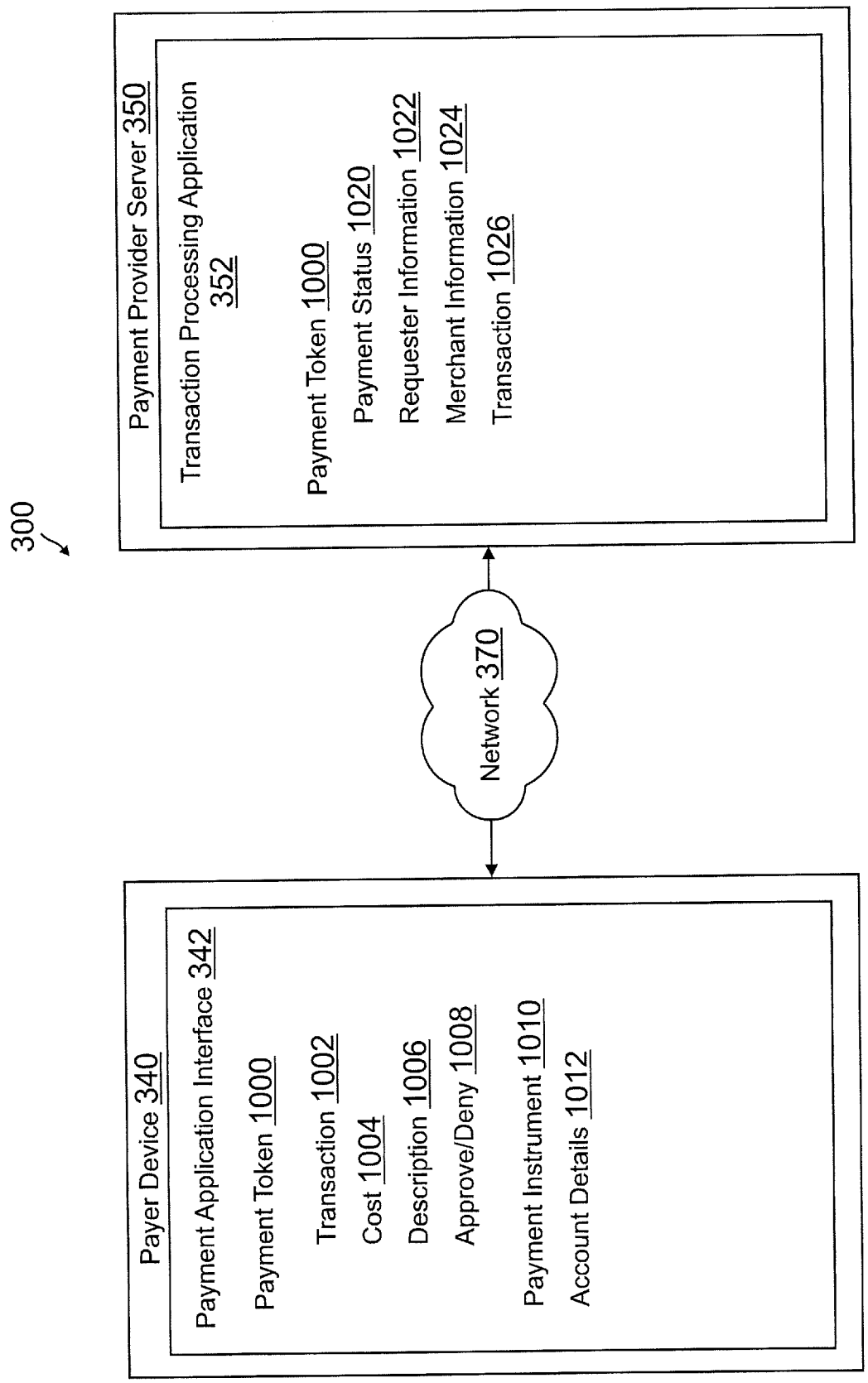
FIG. 3 is an exemplary system environment showing a payer device displaying a receiving payment token for authorizing or declining the transaction in the payment token, according to an embodiment.

FIG. 3 is an exemplary system environment showing a payer device displaying a receiving payment token for authorizing or declining the transaction in the payment token, according to an embodiment. Environment 300 includes a payer device 340, a payment provider server 350, and a network 370 corresponding generally to payer device 140, payment provider server 150, and network 170, respectively, of FIG. 1.

Payer device 340 displays a payment application interface 342 corresponding generally to the processes and features described in reference to payment application 142 of FIG. 1. Payment application interface 342 displays a payment application where the payer (e.g., the user of payer device 340, not shown) may view a payment token and make a decision on whether to pay for the purchase represented by the payment token. In this regard, payment application interface 342 displays a payment token 1000, payment instruments 1010, and account details 1012. Payment token 1000 includes a received payment token from a requester, and may include a transaction field 1002, a cost field 1004, a description field 1006, and an approve/deny button 1008. Transaction field 1002 may display the selected items/ service (e.g., item 221 of FIG. 2) and may have further information about the items/services, such as descriptions, per unit cost, discounts, etc. Cost field 1004 may include a total accrued cost that the payer will pay if the payer accepts the transaction. Description field 1006 include further information submitted by the requester, such as a note, comment, etc., a time limit for validity of payment token 1000, and/or any rules or other settings they have set for accepting or declining payment for the transaction. Approve/deny button 1008 initiates processes to accept payment for the transaction and/or decline payment for the transaction, and may enable the payer to set rules, add notes, or perform other actions when initiating a further process. The payer may select one or more payment instruments used to process a payment for the transaction under payment instrument 1010, and may view their account details (e.g., account balances) under account details 1012. Once the payer has made a decision regarding payment token 1000, the decision may be transmitted to payment provider server 350 over network 370. As shown in FIG. 3, the payer has accepted payment for a transaction associated with transaction field 1002 in payment token 1000, thus a payment is being processed by payment provider server 350.

Payment provider server 350 executes a transaction processing application 352 corresponding generally to the processes and features described in reference to transaction processing application 152 of FIG. 1. As previously described, the payer has accepted payment for transaction 1002. Thus, transaction processing application 352 is processing a payment for payment token 1000, which includes payment status 1020 (e.g., information identifying that the payer has accepted payment for transaction 1002), requester information enabling transaction processing application 352 to alert the requester that payment has been made for transaction 1002, merchant information 1024 enabling transaction processing application 352 to alert the merchant that payment has been made for transaction 1002, and the transaction 1026 information enabling transaction processing application to process payment for transaction 1002 using payment instrument 1010.

Figure 4:
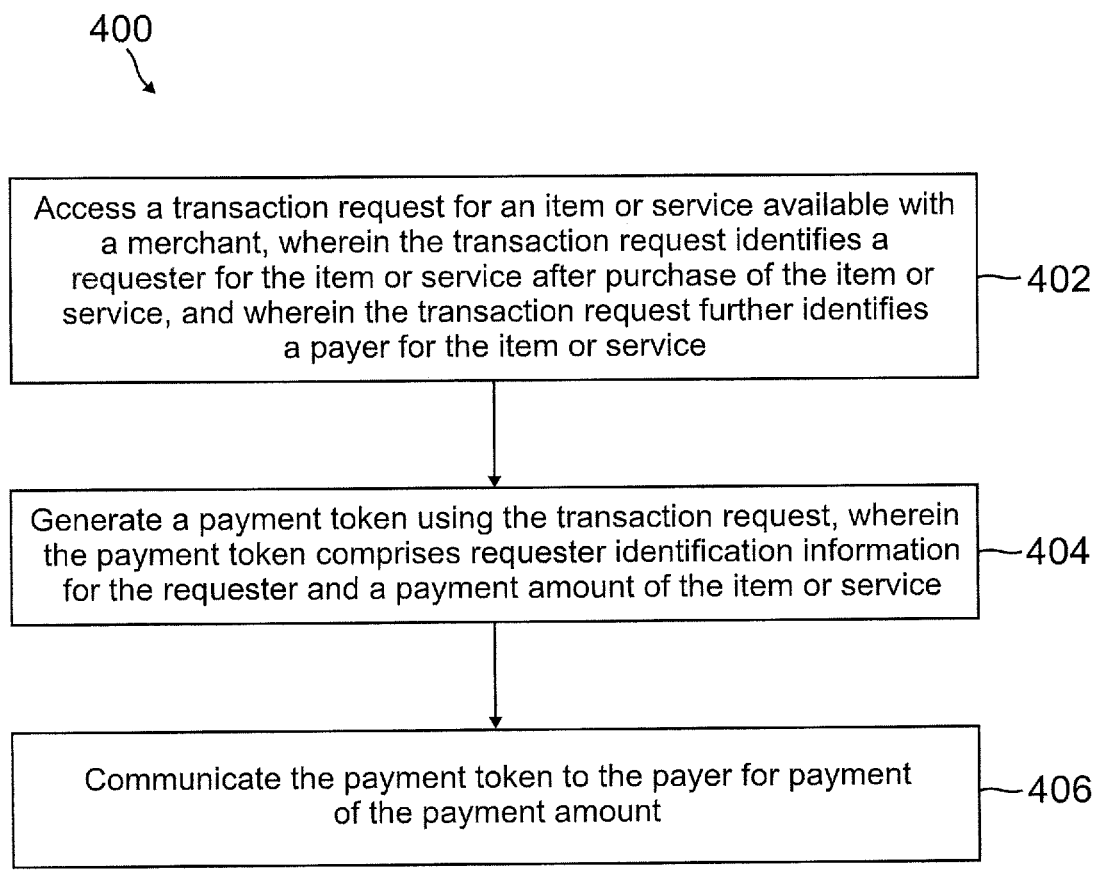
FIG. 4 is a flowchart of an exemplary process for requesting payment for selected items or services using payment tokens, according to an embodiment.

FIG. 4 is a flowchart of an exemplary process for requesting payment for selected items or services using payment tokens, according to an embodiment. Note that one or more steps, processes, and methods described herein may be omitted, performed in a different sequence, or combined as desired or appropriate.

At step 402, a transaction request for an item or service available with a merchant is accessed, wherein the transaction request identifies a request for the item or service, and wherein the transaction request identifies a payer for the item or service. The requester may utilize a payment provider website to submit the transaction request with the merchant or may use a merchant website and/or merchant application to submit the request. The merchant may hold the item or service for purchase for a period of time, which may be denoted in the transaction request. The transaction request may include transaction information, which may comprise at least one of a name for the payer, an email address for the payer, a phone number for the payer, an account of the payer, and a messaging identifier for the payer.

A payment token is generated using the transaction request, at step 404, wherein the payment token comprises requester identification information for the requester and a payment amount of the item or service. The payment token may further comprise at least one of information for the item or service, merchant identification information for the merchant, and validity information for the payment token. The validity information may comprise at least one of a time limit for validity of the payment token, a rule associated with the payment of the payment amount, and a rule associated with receipt and use of the item or service. Additionally, contact information for the payer may be determined using the transaction request, wherein the contact information comprises one of a messaging account, an email address, a payment account with a payment provider, and a phone number, wherein the payment token to the payer using the contact information. A validity of the contact information may also be determined, and the requester alerted based on the validity of the contact information. The merchant for the transaction request may also be alerted of the validity of the contact information. Thus, the contact information may be verified and the merchant may be alerted to cancel the transaction if the contact information is not verified, in certain embodiments. A notification that the payment token was not successfully communicated to the payer may be received, and the notification may be communicated to at least one of the merchant and the requester. However, if the contact information is verified, the payment token may be transmitted to the payer using the contact information.

Thus, at step 406, the payment token is communicated to the payer for payment of the payment amount. Once the payment token is communicated, the requester may be redirected to a merchant website for the merchant after the requester submits the transaction request. Authorization to pay for the transaction in the transaction request may be received from the payer, and a payment for the transaction may be processed. The authorization may comprise at least one rule for the requester based on the payment of the transaction. The authorization may be communicated to at least one of the merchant and the requester. In certain embodiments, a notification that the payer has viewed the token may be received and may be communicated to the merchant. If the payer decides to decline the transaction, a denial of the transaction may be received from the payer and may be communicated to the merchant and/or the requester.

Figure 5:
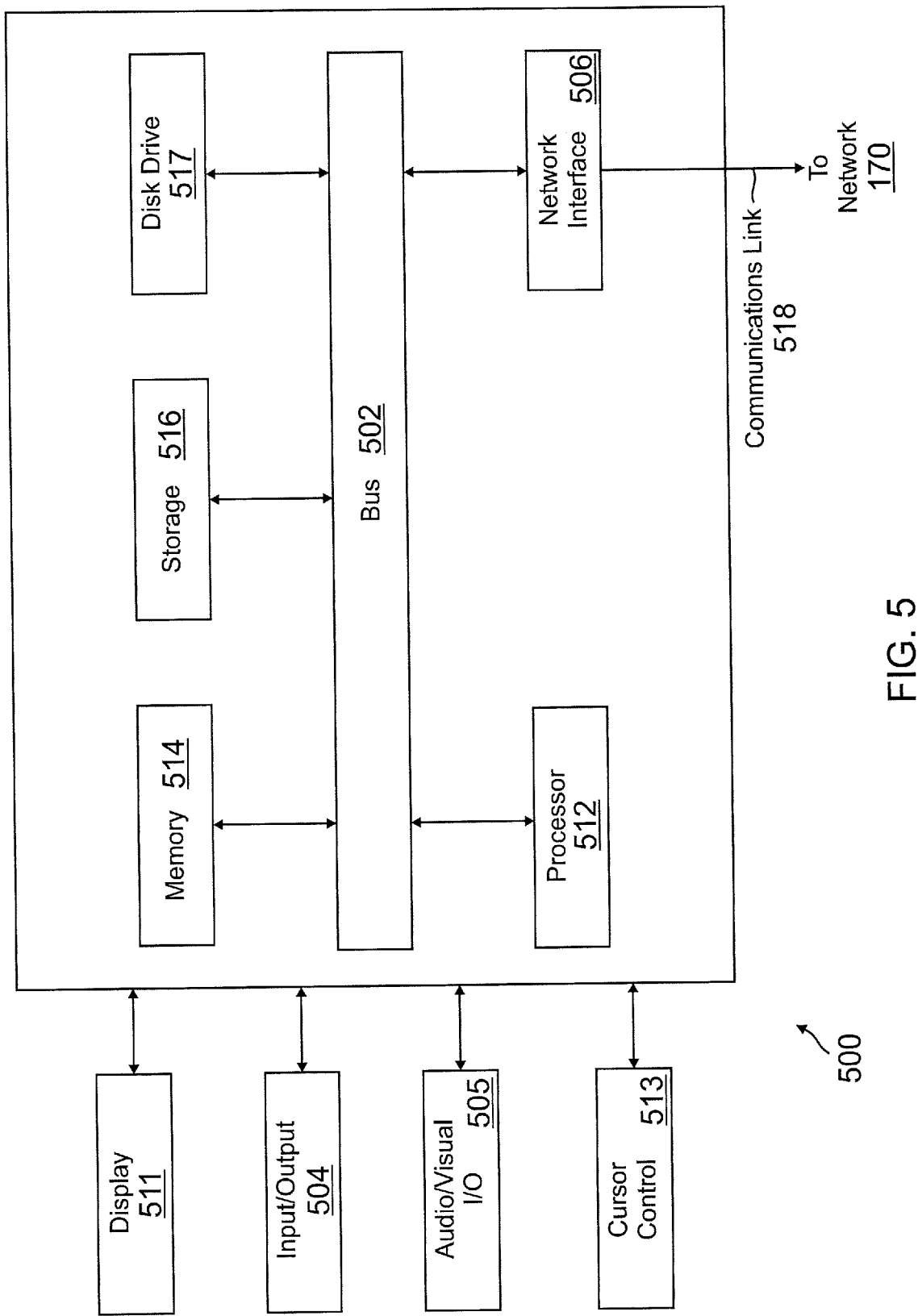
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
a non-transitory memory; and
one or more hardware processors coupled to the non-transitory memory and configured to read instructions from the non-transitory memory to cause the service provider system to perform operations comprising:
receiving a redirection action from a merchant website to a checkout interface provided by the service provider system, wherein the redirection action comprises transaction data for the merchant website and is associated with a transaction on the merchant website between a merchant and a first user;
providing an option to generate a digital token for the transaction data through the checkout interface, wherein the option comprises at least a field for an entry of identification information for a second user;
receiving the identification information via the option;
determining a device identifier for a second user computing device of the second user based on the identification information;
generating the digital token for the second user computing device of the second user based on the transaction data, wherein the digital token enables the transaction data to be loaded to the merchant website using an application of the second user computing device;
causing the transaction data to be loaded to the application on the second user computing device through the merchant web site using the digital token and the device identifier;
causing a first processing option for processing the transaction to be loaded with the transaction data in the application on the second user computing device;
receiving a declination of the first processing option; and
removing the transaction data from the application on the second user computing device.

2. The service provider system of claim 1, wherein the determining the device identifier comprises one of:
a. receiving the device identifier entered to the field of the checkout interface; or
b. determining an account of the second user with the service provider system based on the identification information, wherein the device identifier is determined based further on the account.

3. The service provider system of claim 1, wherein the operations further comprise:
alerting the first user via a first user computing device of the declination of the processing option; and
querying the first user via the first user computing device of whether the first user will process the transaction or identifying one or more additional users to process the transaction.

4. The service provider system of claim 1, wherein the operations further comprise:
causing a second processing option for processing the transaction to be loaded with the transaction data in the application on the second user computing device;
receiving an acceptance of the second processing option, wherein the acceptance comprises an authorization to process the transaction using an account of the second user;
processing the transaction using the account of the second user and the second processing option; and
notifying at least one of the merchant or the first user of the processing the transaction.

5. The service provider system of claim 4, wherein the acceptance further comprises a condition for the processing of the transaction by the second user, and wherein the operations further comprise:
displaying the condition to the at least one of the merchant or the first user based on the processing the transaction.

6. The service provider system of claim 5, wherein prior to the processing the transaction, the operations further comprise:

determining whether the condition has been fulfilled; and
wherein the processing the transaction is in response to determining that the condition has been fulfilled.

7. The service provider system of claim 1, wherein prior to the generating the digital token, the operations further comprise:
determining whether the device identifier is usable to communicate with the second user computing device over a network,
wherein the digital token is further generated in response to determining that the device identifier is usable to communicate with the second user computing device over the network.

8. The service provider system of claim 1, wherein prior to the generating the digital token, the operations further comprise:
determining an expiration condition for the digital token, wherein the digital token is further generated based on the expiration condition,
and wherein subsequent to the causing the transaction data to be loaded, the operations further comprise:
determining whether to cancel the transaction with the merchant website and the digital token based on the expiration condition.

9. The service provider system of claim 1, wherein the operations further comprise:
receiving a message from the second user computing device for the first user; and
transmitting the message with the declination of the first processing option to the first user computing device.

10. A method comprising:
receiving a redirection action from a merchant website to a checkout interface provided by a service provider, wherein the redirection action comprises transaction data for the merchant website and is associated with a transaction on the merchant website between a merchant and a first user;
providing an option to generate a digital token for the transaction data through the checkout interface, wherein the option comprises at least a field for an entry of identification information for a second user;
receiving the identification information via the option;
determining a device identifier for a second user computing device of the second user based on the identification information;
generating the digital token for the second user computing device of the second user based on the transaction data, wherein the digital token enables the transaction data to be loaded to the merchant website using an application of the second user computing device;
causing the transaction data to be loaded to the application on the second user computing device through the merchant web site using the digital token and the device identifier;
causing a first processing option for processing the transaction to be loaded with the transaction data in the application on the second user computing device;
receiving a declination of the first processing option; and
removing the transaction data from the application on the second user computing device.

11. The method of claim 10, wherein the determining the device identifier comprises one of:
a. receiving the device identifier entered to the field of the checkout interface; or b. determining an account of the second user with the service provider based on the identification information, wherein the device identifier is determined based further on the account.

12. The method of claim 10, further comprising:
alerting the first user via a first user computing device of the declination of the processing option; and
querying the first user via the first user computing device of whether the first user will process the transaction or identifying one or more additional users to process the transaction.

13. The method of claim 10, further comprising:
causing a second processing option for processing the transaction to be loaded with the transaction data in the application on the second user computing device;
receiving an acceptance of the second processing option, wherein the acceptance comprises an authorization to process the transaction using an account of the second user;
processing the transaction using the account of the second user and the second processing option; and
notifying at least one of the merchant or the first user of the processing the transaction.

14. The method of claim 13, wherein the acceptance further comprises a condition for the processing of the transaction by the second user, and wherein the method further comprises:
displaying the condition to the at least one of the merchant or the first user based on the processing the transaction.

15. The method of claim 14, wherein prior to the processing the transaction, the method further comprises:
determining whether the condition has been fulfilled; and
wherein the processing the transaction is in response to determining that the condition has been fulfilled.

16. The method of claim 10, wherein prior to the generating the digital token, the method further comprises:
determining whether the device identifier is usable to communicate with the second user computing device over a network,
wherein the digital token is further generated in response to determining that the device identifier is usable to communicate with the second user computing device over the network.

17. The method of claim 10, wherein prior to the generating the digital token, the method further comprises:
determining an expiration condition for the digital token, wherein the digital token is further generated based on the expiration condition,
and wherein subsequent to the causing the transaction data to be loaded, the method further comprises:
determining whether to cancel the transaction with the merchant website and the digital token based on the expiration condition.

18. A non-transitory machine-readable medium having stored thereon machine-readable instructions executable to cause a machine to perform operations comprising:
receiving a redirection action from a merchant website to a checkout interface provided by a service provider, wherein the redirection action comprises transaction data for the merchant website and is associated with a transaction on the merchant website between a merchant and a first user;
providing an option to generate a digital token for the transaction data through the checkout interface, wherein the option comprises at least a field for an entry of identification information for a second user;
receiving the identification information via the option;

determining a device identifier for a second user computing device of the second user based on the identification information;
generating the digital token for the second user computing device of the second user based on the transaction data, wherein the digital token enables the transaction data to be loaded to the merchant website using an application of the second user computing device;
causing the transaction data to be loaded to the application on the second user computing device through the merchant web site using the digital token and the device identifier;
causing a processing option for processing the transaction to be loaded with the transaction data in the application on the second user computing device;
receiving a declination of the processing option; and
removing the transaction data from the application on the second user computing device.

19. The non-transitory machine-readable medium of claim 18, wherein prior to the generating the digital token, the operations further comprise:
determining whether the device identifier is usable to communicate with the second user computing device over a network; and
determining an expiration condition for the digital token, wherein the digital token is further generated in response to determining that the device identifier is usable to communicate with the second user computing device over the network and based on the expiration condition.

20. The method of claim 10, further comprising:
receiving a message from the second user computing device for the first user; and
transmitting the message with the declination of the first processing option to the first user computing device.

* * * * *